United States Patent
Schmitt et al.

(10) Patent No.: US 6,904,061 B2
(45) Date of Patent: Jun. 7, 2005

(54) TRANSPARENT TRANSPORT OVERHEAD MAPPING

(75) Inventors: Andrew Schmitt, Salem, NH (US); Tim Boggess, Hooksett, NH (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 894 days.

(21) Appl. No.: 09/882,582

(22) Filed: Jun. 14, 2001

(65) Prior Publication Data

US 2002/0018258 A1 Feb. 14, 2002

Related U.S. Application Data

(60) Provisional application No. 60/212,071, filed on Jun. 14, 2000.

(51) Int. Cl.[7] .............................. H04J 3/04; H04B 7/212; H04B 10/20
(52) U.S. Cl. ....................... 370/535; 370/442; 370/528; 398/58
(58) Field of Search ................................. 370/535, 442, 370/216–228, 527–529; 398/2, 58

(56) References Cited

U.S. PATENT DOCUMENTS

| | | | |
|---|---|---|---|
| 4,319,273 A | 3/1982 | Nossem | 358/120 |
| 4,321,703 A | 3/1982 | Schwäertzel et al. | 370/89 |
| 4,449,247 A | 5/1984 | Waschka, Jr. | 455/9 |
| 4,516,240 A | 5/1985 | Kume et al. | 370/85 |
| 4,594,708 A | 6/1986 | Servel et al. | 370/94 |
| 4,685,105 A | 8/1987 | Shikama et al. | 370/86 |
| 4,763,319 A | 8/1988 | Rozenblit | 370/84 |
| 4,764,921 A | 8/1988 | Graves et al. | 370/100 |
| 4,771,425 A | 9/1988 | Baran et al. | 370/85 |
| 4,835,768 A | 5/1989 | Hubbard et al. | 370/106 |
| 4,893,306 A | 1/1990 | Chao et al. | 370/94.2 |
| 4,967,405 A | 10/1990 | Upp et al. | 370/1 |
| 5,001,708 A | 3/1991 | Williams et al. | 370/105.1 |
| 5,018,132 A | 5/1991 | Williams et al. | 370/13 |
| 5,040,170 A | 8/1991 | Upp et al. | 359/135 |
| 5,134,614 A | 7/1992 | Baydar et al. | 370/94.1 |
| 5,142,529 A | 8/1992 | Parruck et al. | 370/84 |
| 5,144,297 A | 9/1992 | Ohara | 340/825.79 |
| 5,150,243 A | 9/1992 | Suzuki | 359/110 |
| 5,185,736 A | 2/1993 | Tyrrell et al. | 370/55 |
| 5,189,410 A | 2/1993 | Kosugi et al. | 340/825.14 |
| 5,220,563 A | 6/1993 | Grenot et al. | 370/94.1 |
| 5,247,518 A | 9/1993 | Takiyasu et al. | 370/85.15 |
| 5,265,096 A | 11/1993 | Parruck | 370/110.1 |
| 5,315,594 A | 5/1994 | Noser | 370/110.1 |
| 5,355,238 A | 10/1994 | Kight et al. | 359/135 |
| 5,471,476 A | 11/1995 | Hiramoto | 370/105.1 |
| 5,623,357 A | 4/1997 | Kight et al. | 359/135 |
| 6,256,326 B1 | 7/2001 | Kudo | 370/512 |
| 2001/0012289 A1 * | 8/2001 | Norman | 370/535 |

FOREIGN PATENT DOCUMENTS

WO    WO 95/05710    2/1995

* cited by examiner

*Primary Examiner*—Steven Nguyen
(74) *Attorney, Agent, or Firm*—Christie, Parker & Hale, LLP

(57) ABSTRACT

A mapping operation maps identified bytes of a transport overhead of a data stream to other unused areas of the overhead. A de-mapping operation maps the bytes mapped by the mapping operation back to the locations from which the bytes were moved. A passing operation is used to handle data stream transitions in which multiple tributaries are multiplexed into or out of a single connecting data stream.

26 Claims, 7 Drawing Sheets

TRANSPARENT TRANSPORT OVERHEAD MAPPING

CROSS-REFERENCE TO RELATED APPLICATION(S)

This application claims the benefit of the filing date of U.S. Provisional Application entitled Transparent Transport Overhead Mapping (Application No. 60/212,071) filed on Jun. 14, 2000 of which is hereby incorporated by reference as if set forth in full herein.

BACKGROUND

The present invention relates generally to optical network and, more specifically, to maintaining optical networking protocols between optical network connections.

Optical networks generally include a large number of nodes, and often connect to a number of optical networks which may be maintained by a number of different entities. Data flow from and to nodes may vary, and at times any two nodes may communicate on an irregular basis.

Often communications between nodes are subject to particular demands, particularly quality of service demands. These demands may, for example, relate to data rates, data error rates, and other factors. To fulfill these demands connections are made, or unmade, between potentially a large number of nodes to provide reliable delivery of protocols or rate independent services between any two network nodes.

Preferably, light containing data would enter a network at point A and would emerge at point B error-free and without apparent modification, regardless of the number of intermediate nodes or the entities controlling the intermediate nodes. A client utilizing such a connection would be able to transmit at any frequency, with any protocol, and without knowledge of the topology of the optical connection or it's protection scheme. Such an optical network would provide a very valuable feature set by adding manageability, reliability, and connection flexibility to a wavelength.

A rate and protocol independent network would be attractive because such a network provides a transport layer for any type of client that an operator wishes to use. Also, such an optical network would provide connections that are protocol and rate independent allowing any type of client to pass through the network in a transparent manner. Unfortunately the same characteristics that would make a transparent network attractive also complicate realization of the network. Without knowledge of the protocol and the bit-rate being transmitted through the network it is difficult to provide manageability, reliability, and connection flexibility. Without accessing the protocol it is difficult to provide Quality of Service (QOS) guarantees that customers often demand.

Synchronous optical network (SONET) and synchronous data hierarchy (SDH) are standards for optical telecommunication that are increasingly popular and pervasive. However, SONET/SDH, as an optical networking protocol, has an inherent lack of transparency in it's protocol stack. Specifically, SONET/SDH generally does not allow two carriers to mesh their networks without interrupting the management structure of each other. The rigid Section, Line, and Path Termination architecture of SONET/SDH protocols assumes that the end to end link is managed entirely by one carrier, which may not be the case.

As such, the SONET/SDH protocol was not designed to support nested domains and allow carriers to mesh their networks together. Conventionally, the unit of handoff is DS-1 or DS-3, however, neither allows one carrier's management data to tunnel through another's network. As such, SONET/SDH management information contained in the SONET/SDH overhead that may be replaced when a signal leaves one carriers domain and crosses into another would cause difficulties. This management information includes bytes for bit error rate (B1/2/3), section and path trace (J0 and J1), data communication (D1–D12), orderwire and perhaps proprietary bytes. From the original carrier's perspective, the other carrier providing the nested domain has substituted their own overhead information in place of the original bytes. The nested domain is opaque to the bandwidth customers SONET/SDH OAM&P information.

SUMMARY

The present invention provides methods and systems that maintain optical networking protocols between optical network connections. In one embodiment, optical networking protocols between optical network connections are maintained by identifying locations of unused portions in overhead of transmission, mapping predetermined portions in the overhead of the transmission to the identified locations, and mapping the predetermined portions from the identified locations to locations in the overhead that were occupied by the predetermined portions prior to the mapping of the predetermined portions to the identified locations. In a further embodiment, data streams with multiple tributaries are combined into a single data stream and/or a single data stream is split into multiple tributaries.

In another embodiment the present invention provides a transport system maintaining optical networking protocols between optical network connections of a first network coupled to a second network. The transport system comprises a map switch and a de-map switch. The map switch is coupled to the second network and configured to identify unused portions in an overhead of a data stream from the first network and to map predetermined portions in the overhead of the data stream to the identified unused portions. The de-map switch is coupled to the second network and configured to map the predetermined portions from the identified unused portions back to locations in the overhead of the data stream previously occupied by the predetermined portions, prior to the mapping of the predetermined portions to the identified unused portions. In a further embodiment, the transport system further comprises a pass switch coupled to the second network and configured to combine data streams with multiple tributaries into a single data stream and to split a single data stream into multiple tributaries.

These and other aspects of the present invention will be more readily appreciated upon review of the following discussion and in view of the accompanying figures.

DETAILED DESCRIPTION

Figure 1:
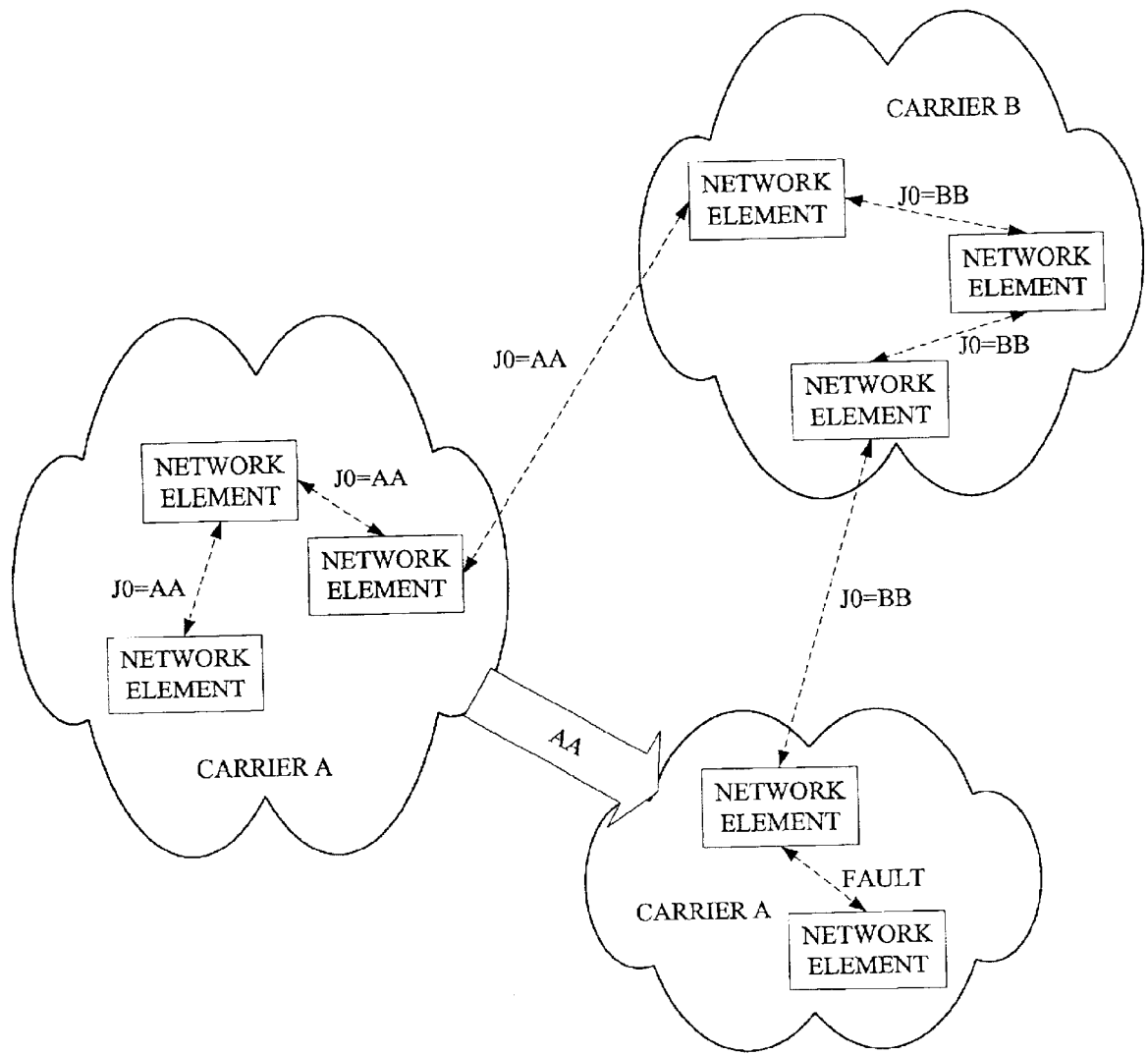
FIG. 1 illustrates a block diagram of a system in accordance with aspects of the present invention.

In FIG. 1, a node associated with a first network or carrier A (bandwidth customer) transmits a SONET signal or data stream to another node associated with carrier A. The data stream is transmitted through a number of nodes associated with carrier A, and is then passed off to nodes associated with a second network or carrier B. Carrier B, in the example of FIG. 1, is a bandwidth supplier to carrier A, allowing carrier A to transmit some or all of carrier A's data traffic over network elements of carrier B.

After transmission through carrier B's network, the data stream is returned to nodes associated with carrier A. Upon return to carrier A's network, preferably the nodes of carrier A may maintain overhead data of the data stream without regard as to whether the data stream was carried entirely over carrier A's network, or whether the data stream also traversed part of carrier B's network. For example, and as illustrated in FIG. 1, the data stream in carrier A's network 1 byte tag, the J0 byte, set to AAh. However, carrier B is configured to set the J0 byte as BBh. Thus, when the signal returns to carrier A, the J0 byte is now set to BBh.

Unless carrier A makes arrangements within it's network operating system (OS) in advance, it appears to carrier A's network OS that the J0 byte has been set to BBh, indicating a mis-connection fault in carrier A's network. This mis-connection fault is false and causes errors or other similar types of problems with carrier A's overhead administrative management and protocol (OAM&P) infrastructure.

For instance, both carrier B, acting as a bandwidth supplier, and carrier A, acting as a customer, manage the connection matrix of their SONET/SDH network using the J0 section trace byte. The J0 byte contains a repeating 1, 16, or 64 byte message that acts as a virtual SONET/SDH nametag. Observation of this value allows the provisioning of add/drop multiplexers (ADM's) and other SONET/SDH and wavelength grooming resources to verify they are configured properly. Hence, when the J0 byte is modified by carrier B, carrier A improperly detects a configuration fault.

By providing transparency, network carriers, such as carrier A and B, are allowed to deploy an optical network that allows the carriers to provide and manage connections without regard to the type of equipment utilizing the network. As such, almost any network carrier is enabled to provide optical connections and thus act as a commodity bandwidth supplier. For instance, a network carrier can provide bandwidth brokering services, i.e. leasing an optical connection to an end customer (typically another carrier) that will incorporate the new link as another connection within its network. Alternatively, two carriers may trade bandwidth, each supplementing exhausted routes with ones that are under-utilized by the other.

Figure 2:
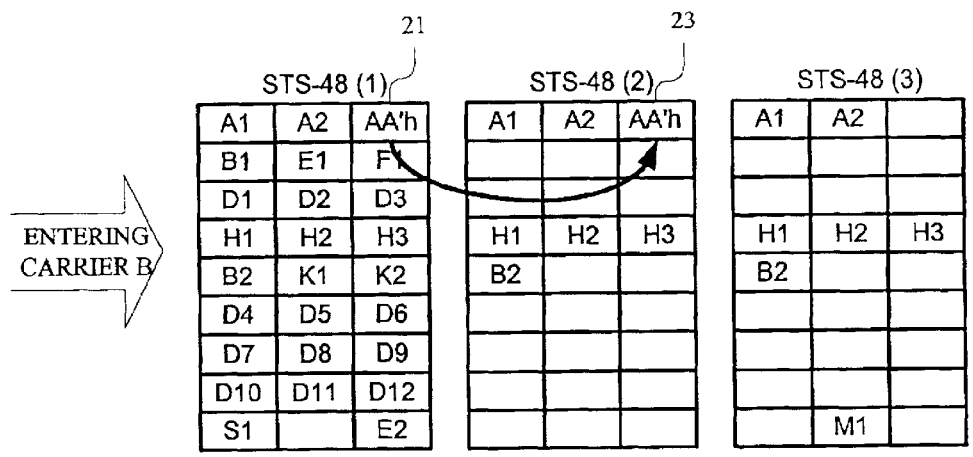
FIG. 2 illustrates a map representing the first three STS-1 frames of a STS-48 data stream.
Figure 2:
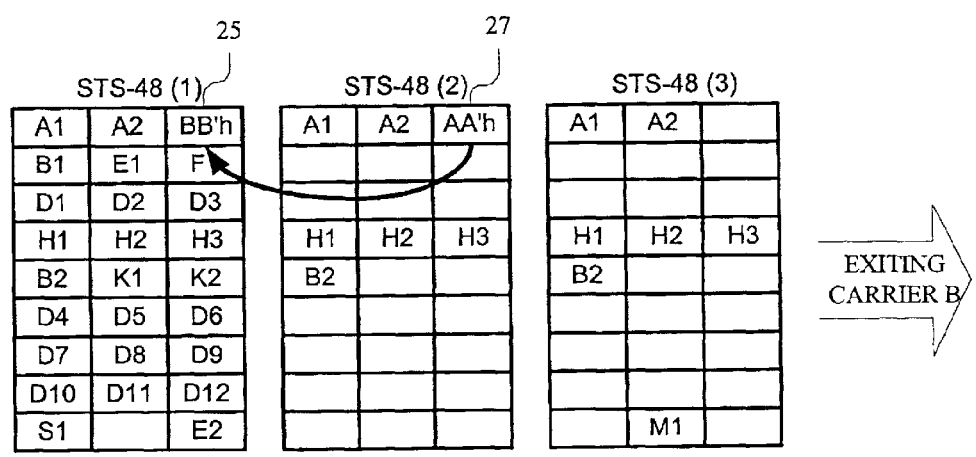

Referring now to FIG. 2 in conjunction with FIG. 1, an exemplary SONET signal, i.e., a STS-48 data stream, is shown. The STS-48 data stream includes STS-1 frames which are the basic units for SONET communications. For readability, only portions of the transport overhead for the STS-48 data stream are shown. An AA'h message 21 is received by carrier B in the first frame or channel of the data stream. Carrier B saves or maps the AA'h message in an unused part 23 of the SONET/SDH overhead. As such, carrier B is able to replace the AA'h message with it's own BB'h message 25 without losing the AA'h message.

Generally, the replacement or mapping operation is performed at the ingress to carrier B's network. Subsequently, each network element or node within carrier B's network is able to transparently pass the AA'h message now occupying a byte of the unused overhead. Upon exiting carrier B, the original AA'h message is placed back or de-mapped from it's known overhead location 27 and restored, for example, to the J0 byte position.

Similarly, other bytes, such as detected parity errors or the DCC bytes for intra-equipment communication can be mapped and de-mapped. Hence, the OAM&P information to be eventually received by carrier A appears exactly as it was originally transmitted and also carrier B is allowed to use the SONET/SDH overhead in its own fashion and in a standard manner. Also, client and protocol independent characteristics of optical networking can be combined with a well-known and widely deployed protocol.

Furthermore, by providing mapping and de-mapping of portions of transport overhead, bandwidth consumers, e.g., carrier A, are permitted to overlay their own preferred operations, administration, maintenance, and provisioning (OAM&P) structure, e.g., SONET/SDH, and make the leased link appear as a new segment of their own network without concerns that the bandwidth vendor, e.g., carrier B, will discard or corrupt the bandwidth consumer's OAM&P structure. As such, the leased link becomes a 'nested domain' within the customer's larger network. At the same time, the bandwidth vendor, e.g., carrier B, is able to monitor and guarantee contractual QOS parameters agreed upon at the commodity exchange, and manage many different links that have been leased to countless other customers. In effect, two or more bandwidth consumers that want management information transmitted over the same link and want unrestricted access to the protocol overhead are permitted and enabled to do so.

Figure 3:
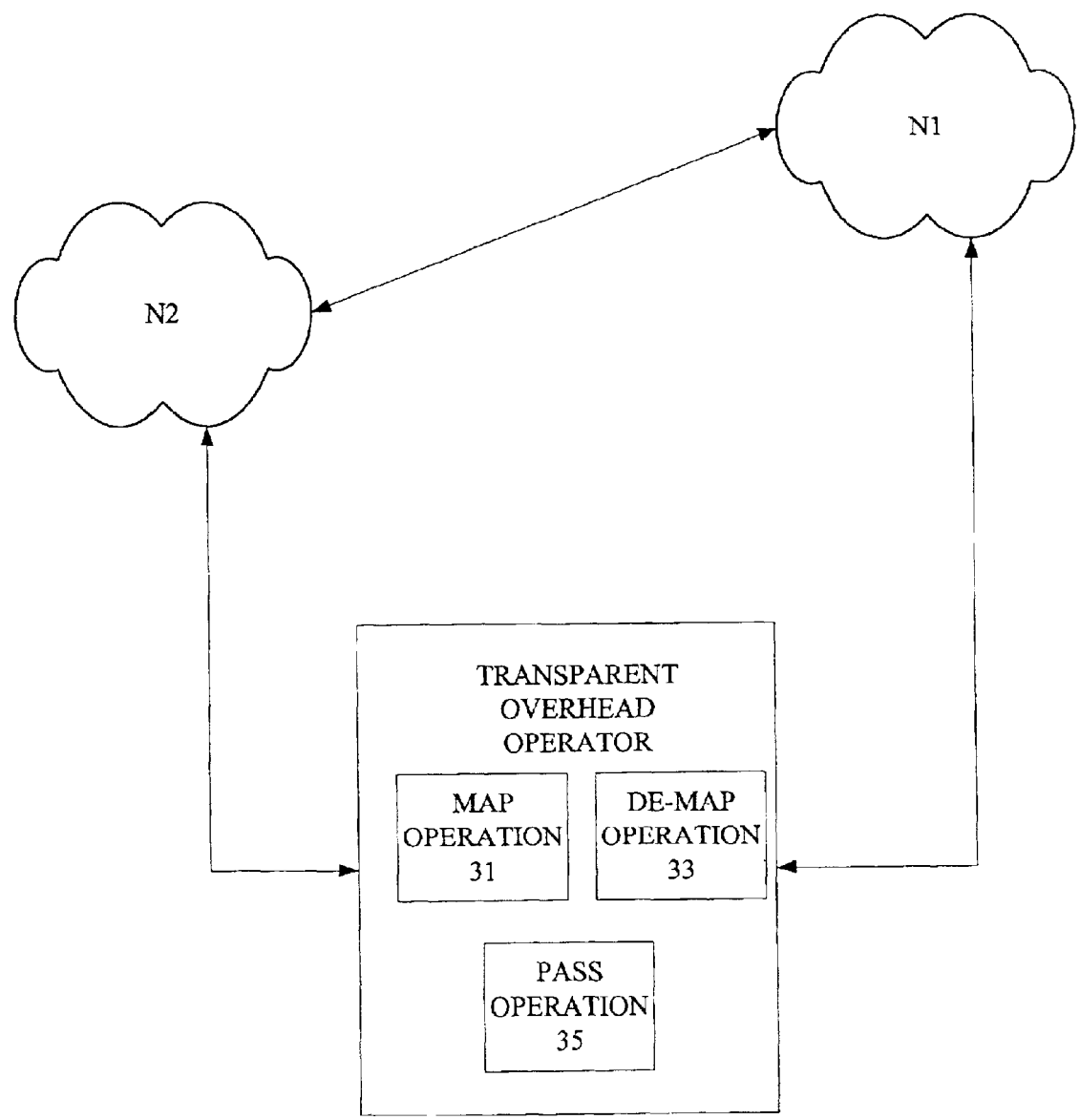
FIG. 3 illustrates a block diagram of one embodiment of a system in accordance with aspects of the present invention.

In FIG. 3, a first network N1 is coupled to a second network N2. That is, data is passed from network N1 to network N2 and vice versa. In the described embodiment, the data is passed over a synchronous optical network (SONET) compliant data link or the international equivalent, synchronous data hierarchy (SDH) compliant data link. As a SONET/SDH compliant data link, data is provided in frames. Each frame includes a payload and a transport overhead (TOH).

As illustrated, two data links are used. A first data link directly links N1 with N2. Thus, TOH is maintained between N1 and N2, i.e., no intermediary devices are used to change the TOH. Accordingly, if N1 sends information to N2, N2 will receive the information including the expected payload and TOH, minus any errors that occur in the transmission (bit errors).

The second data link also operationally couples the first and second networks N1 and N2. The second data link is, for example, a third party carrier. When data is passed through the third party carrier, the third party carrier is likely to overwrite portions of the TOH to suit its own purposes. Data received from the third party carrier, therefore, includes unexpected or modified TOH as far as N2 is concerned. Accordingly, the unexpected or modified TOH causes the second network N2 problems with respect to the operation, administration, maintenance and provisioning information contained in the TOH.

The third party carrier, therefore, includes a mapping operation 31, a de-mapping operation 33, and a passing operation 35. The mapping operation maps identified bytes of the TOH to other, preferably unused, areas of the TOH.

This is generally accomplished at the entrance to the third party carrier. The third party carrier also includes a de-mapping operation. The de-mapping operation maps the bytes mapped by the mapping portion to unused portions of the overhead back to the locations from which the bytes were moved. The de-mapping operation is generally accomplished at the exit of the third party carrier. Thus, the mapping and de-mapping portions of the third party carrier allow for TOH to be seamlessly passed from the first network N1 to the second network N2.

The third party carrier also includes a passing operation. The passing operation is used to handle data stream transitions in which multiple tributaries are multiplexed into or out of a single connecting data stream. For instance, the data stream from the first network N1 to the second network N2 is merged into another data stream, or the data stream from the first network N1 to the second network N2 is split into multiple data streams. For example, the linked first and second networks N1 to N2 not using a third party carrier may be an OC-12 link, whereas the third party carrier uses an OC-48 link. As another example, the link between the first and second network N1 and N2 may be an OC-48 link, whereas the link using the third party carrier is an OC-12 link. In either event, the transitions between one type of link to another type of link presents difficulties. More particularly, some data may require special handling.

For example, a J0 portion (section trace) of the TOH may be one byte, 16 bytes, or 64 bytes. If the data stream is de-multiplexed into a number of smaller data streams, the number of bytes available for the J0 byte may be less than the number of bytes used in the TOH of the larger data stream. Alternatively, a smaller data stream may be merged into a larger data stream. The J0 bytes, therefore, are written into a 64 byte memory. The 64 byte memory is thereafter sequentially accessed to write into the portion of the transport overhead allocated by the mapping operation for the J0 byte. Thus, if only one byte is available for a 64 byte J0 byte, one byte from 64 consecutive frames would contain the J0 byte information. Alternatively, if 64 bytes are available for the J0 information, then the one byte J0 is repeated 64 times.

Similarly, in one embodiment, the B1 (used for section error monitoring), B2 (used for line error monitoring), and M1 (used for reporting) bytes may require special handling. Generally, bit errors are encountered during data transmission. As the size available for the B1, B2, and M1 bytes changes, therefore, zeros are either stuffed into additional space available for the B1, B2, and M1 bytes, or zeros are removed from the B1, B2, M1 bytes.

Figure 4:
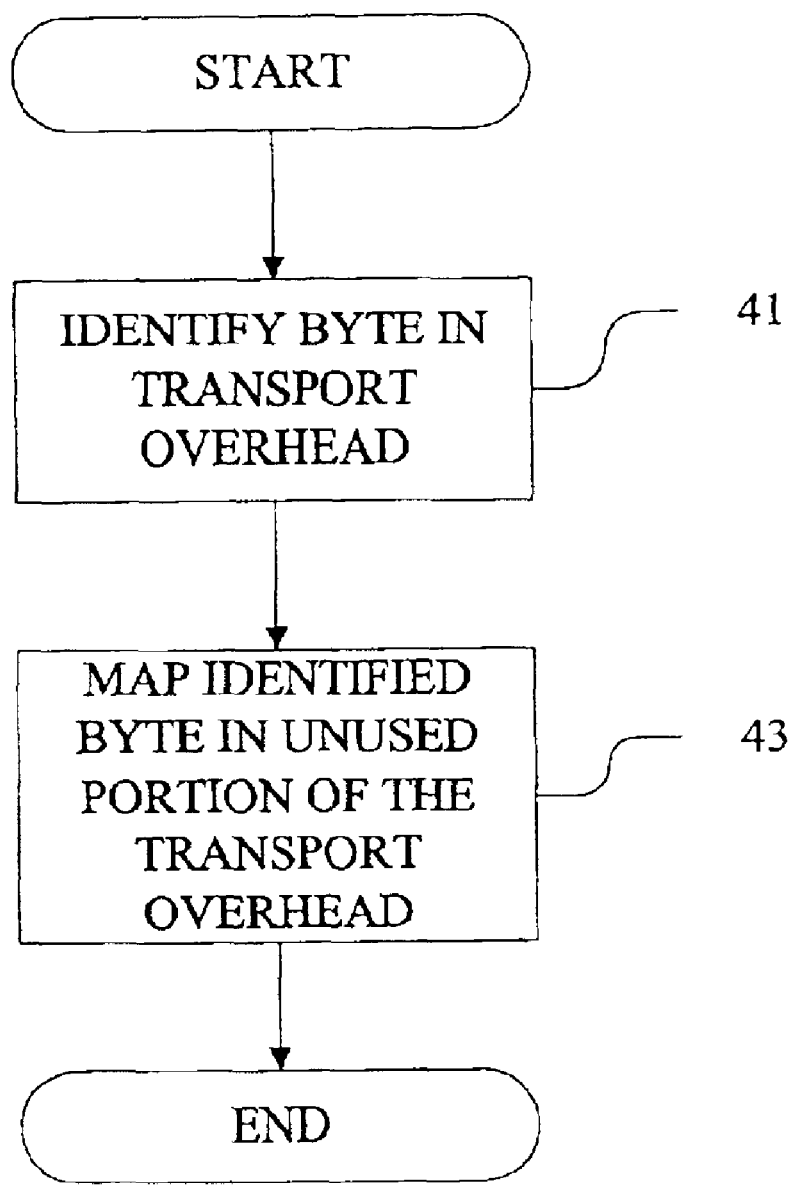
FIG. 4 illustrates a flow diagram of a process for performing a map operation.

FIG. 4 illustrates a flow chart of a process for performing a map operation. The process, in block 41, identifies a specific byte in the transport overhead of a data stream. In block 43, the process maps the identified byte to an unused portion of the transport overhead and the process ends. Thus, bytes are moved from one area in the transport overhead to another area in the transport overhead. In one embodiment, this is done such that bytes from one frame of the transport overhead are written to a later frame.

Figure 5:
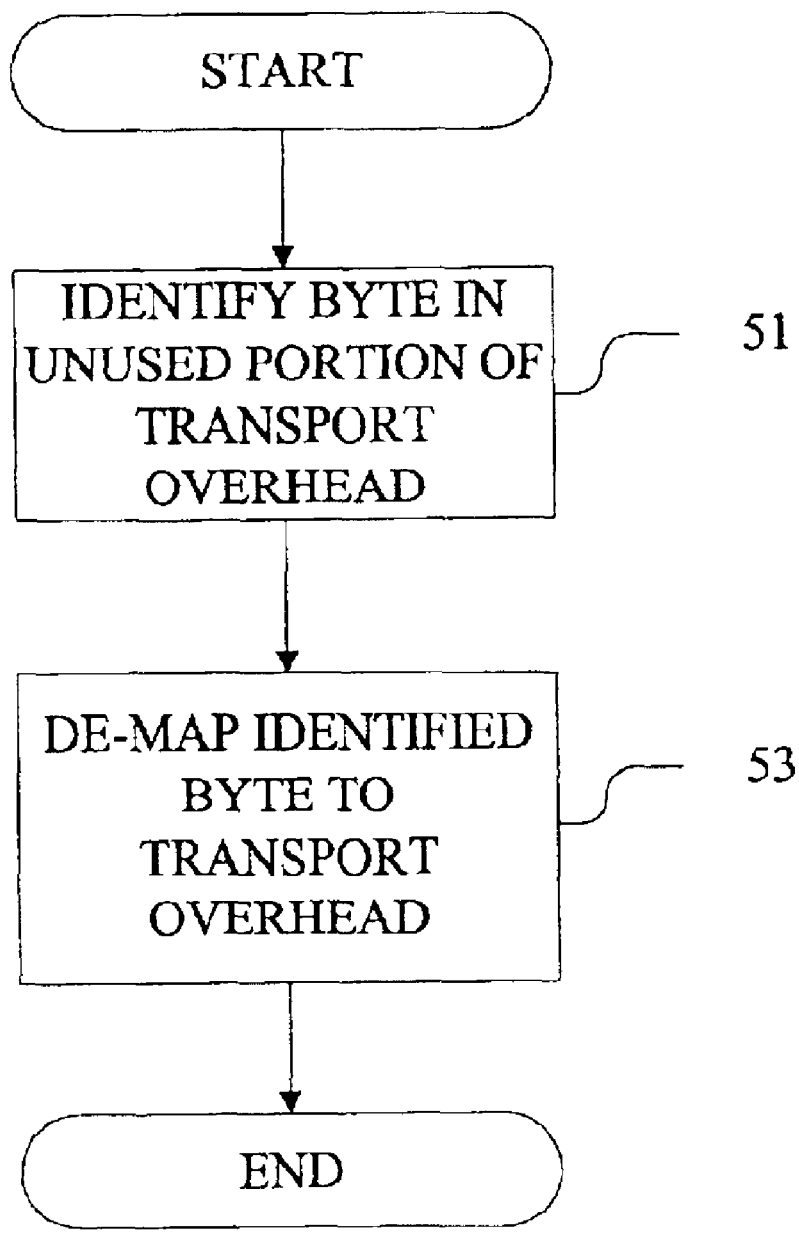
FIG. 5 illustrates a flow diagram of a process for performing a de-mapping operation.

FIG. 5 illustrates a process for performing a de-mapping operation. In block 51, the process, identifies a byte previously mapped to the unused portion of the transport overhead. The process, in block 53, de-maps or writes back the identified byte to the appropriate location in the transport overhead and the process ends. The appropriate location is the location from which identified byte originally appeared in the transport overhead.

Figure 6:
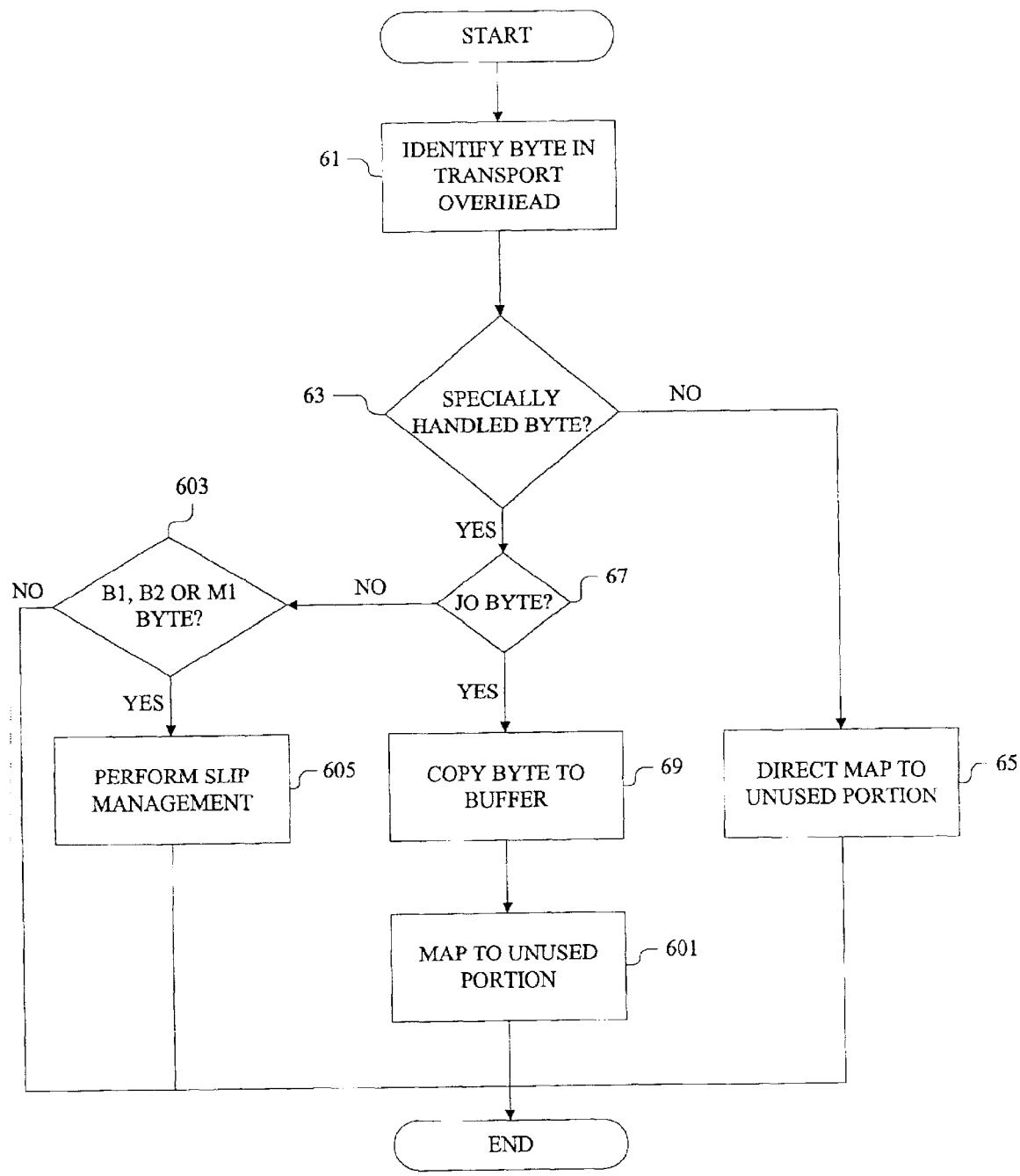
FIG. 6 illustrates a flow diagram of a process for performing a pass operation.

FIG. 6 illustrates a process for performing a pass operation. The process, in block 61, identifies bytes in the unused portion of the transport overhead. In block 63, the process determines if the bytes are or are not specially handled bytes. If the bytes are not specially handled bytes, the process directly maps the identified bytes in block 65 and the process ends. If the bytes are specially handled bytes, in this embodiment, the B1, B2, M1, and J0 bytes, the bytes are subjected to slip management manipulation.

In the embodiment illustrated, the process determines if the specially handled bytes is a J0 byte, in block 67. If the specially handled byte is a J0 byte, the process, in block 69, copies the J0 byte to a buffer. In block 601, the process maps the buffer to the unused portions of the overhead and the process ends. Also, in the embodiment illustrated, the process determines if the specially handled bytes are B1, B2 and M1 bytes, in block 603. If the specially handled bytes are B1, B2 and M1 bytes, the process, in block 605, analyzes and adjusts the bytes based on the bit error rates and the process ends. In other words, in one embodiment, the bit error rate or the information about the bit error rate of a data stream is induced or adjusted to provide all or some of the information about the bit error rate experienced throughout the data stream, e.g., from one end of the data stream to the other end.

Figure 7:
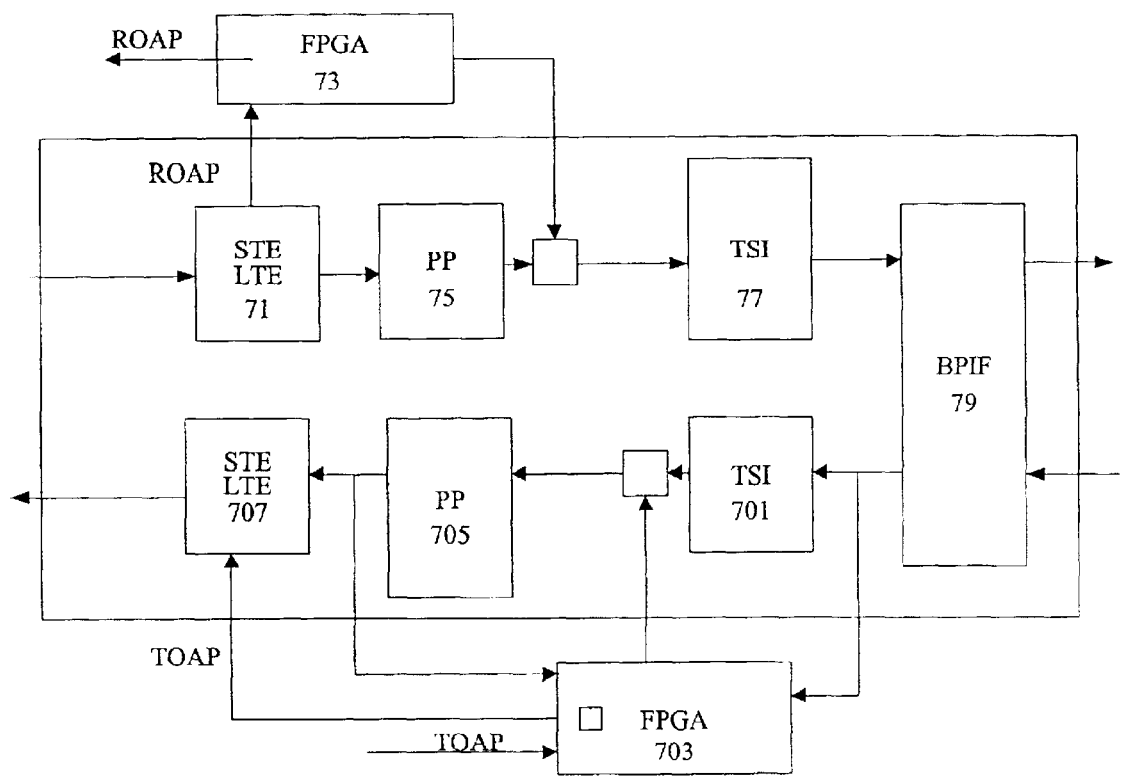
FIG. 7 illustrates a detailed diagram of one embodiment of a system in accordance with aspects of the present invention.

In FIG. 7, a data stream is received by a section and line termination receiver 71. The data stream is section and line terminated and overhead information from the data stream are sent to the received overhead access port (ROAP) via a field programmable grid array (FPGA) 73. The FPGA processes the transport overhead to provide transport overhead monitoring and modification, e.g., identify bytes in the transport overhead that requires mapping and mapping the bytes identified to unused portions of the overhead. The section and line termination receiver 71 forwards the data stream to a pointer processor 75. The pointer processor performs path error monitoring and tributary support functions on the data stream. After the pointer processor, the FPGA maps predetermined portions of the overhead into the unused portion of the overhead, after a pointer processor (PP). Data in the payload envelope of the data stream is forwarded on or, in one embodiment, also processed by the FPGA. The data stream is also inspected for embedded transparent bytes and mapped around the frequency justification of the pointer processor.

The data stream is provided to a time slot interchange switch 77 that provides non-blocking frame connectivity. The time slot interchange switch 77 and/or the pointer processor performs path operations, e.g., handling data stream transitions in which multiple tributaries are multiplexed into or out of a single connecting data stream. The time slot interchange switch is coupled to a backplane interface 79 that performs bit error rate monitoring and de-skew functionally for data and timing alignment. The backplane interface also allows connectivity to other network devices, such as time slot interchange switches and add/drop multiplexers, in which, in one embodiment, path operations are performed.

A data stream being transmitted is provided to the time slot interchange switch 701 from the backplane interface. Similar to the time slot interchange switch 77, the time slot interchange switch 701 provides non-blocking frame connectivity and is coupled to a pointer processor 705. The time slot interchange switch 701 and/or the pointer processor 705 performs path operations. Overhead data is extracted at the output of the time slot interchange switch and sent to the FPGA 703. The FPGA processes the transport overhead to provide transport overhead monitoring and modification, e.g., identifies bytes in the unused portion of the transport overhead that requires de-mapping and de-maps the bytes identified. A user transmit overhead access port (TOAP) coupled to the FPGA allows user control and/or modification of portions of the transport overhead. The data stream is sent to the pointer processor 705 and then to a section and line transmitter 707 for transmitting to the rest of the network or other networks.

Accordingly, the present invention provides a transparent transport overhead system. Although this invention has been described in certain specific embodiments, many additional modifications and variations will be apparent to those skilled in the art. It is therefore to be understood that this invention may be practice otherwise than as specifically described. Thus, the present embodiments of the invention should be considered in all respects as illustrative and not restrictive.

What is claimed is:

1. A method of maintaining optical networking protocols between optical network connections, the method comprising:
   identifying locations of unused portions in overhead of transmission;
   mapping predetermined portions in the overhead of the transmission to the identified locations; and
   mapping the predetermined portions from the identified locations to locations in the overhead that were occupied by the predetermined portions prior to the mapping of the predetermined portions to the identified locations.

2. The method of claim 1 wherein mapping further comprises:
   maintaining a lookup table regarding locations of the predetermined portions and identified unused portions; and
   referencing the lookup table to identify locations.

3. The method of claim 1 wherein mapping the predetermined portions occurs at the entrance to a third party carrier.

4. The method of claim 1 further comprising combining data streams with multiple tributaries into a single data stream.

5. The method of claim 1 further comprising splitting a single data stream into multiple tributaries.

6. The method of claim 1 wherein the predetermined portion of the overhead is a J0 byte.

7. The method of claim 6 further comprising:
   storing the predetermined portion to a memory;
   sequentially accessing the memory; and
   writing into the portion of the transport overhead.

8. The method of claim 1 wherein mapping further comprises:
   determining an amount of space required by the predetermined portion;
   determining an amount of space allocated for the identified portion in the transport overhead;
   placing the predetermined portion into the overhead based on the amount of space required by the predetermined portion and the amount of space allocated for the identified portion.

9. The method of claim 8 further comprising repeatedly placing portions of the predetermined portion into the identified portion in the overhead until the amount of space allocated is filled.

10. The method of claim 8 further comprising adding zeros after the identified portion until the amount of space allocated is filled.

11. The method of claim 8 further comprising consecutively placing a sub-portion of the predetermined portion for each consecutive frame until an entire portion of the predetermined portion is placed in the overhead.

12. The method of claim 8 further comprising removing zeros in the predetermined portion until the amount of space allocated is filled.

13. The method of claim 1 wherein the predetermined portion of the overhead are B1, B2, and M1 bytes.

14. An transport system maintaining optical networking protocols between optical network connections of a first network coupled to a second network, the system comprising:
   map switch coupled to the second network and configured to identify unused portions in an overhead of a data stream from the first network and to map predetermined portions in the overhead of the data stream to the identified unused portions; and
   de-map switch coupled to the second network and configured to map the predetermined portions from the identified unused portions back to locations in the overhead of the data stream previously occupied by the predetermined portions, prior to the mapping of the predetermined portions to the identified unused portions.

15. The transport system of claim 14 further comprising a pass switch coupled to the second network and configured to combine data streams with multiple tributaries into a single data stream and to split a single data stream into multiple tributaries.

16. The transport system of claim 14 wherein the map switch further comprises a lookup table regarding locations of the predetermined portions and identified unused portions and the map switch references the lookup table to identify the locations.

17. The transport system of claim 14 wherein the map switch is placed at an entrance of the second network.

18. The transport system of claim 14 wherein the de-map switch is placed at an exit of the second network.

19. The transport system of claim 14 wherein the predetermined portion of the overhead is a J0 byte.

20. The transport system of claim 14 wherein the predetermined portion of the overhead are B1, B2, and M1 bytes.

21. The transport system of claim 19 wherein the de-map switch is further configured to store the predetermined portion to a memory, sequentially access the memory and write into the portion of the transport overhead.

22. The transport system of claim 14 wherein the map switch is configured to determine an amount of space required by the predetermined portion and an amount of space allocated for the identified portion in the transport overhead and place the predetermined portion into the overhead based on the amount of space required by the predetermined portion and the amount of space allocated for the identified portion.

23. The transport system of claim 14 wherein the map switch is configured to repeatedly place portions of the predetermined portion into the identified portion in the overhead until the amount of space allocated is filled.

24. The transport system of claim 23 wherein the map switch is configured to add zeros after the identified portion until the amount of space allocated is filled.

25. The transport system of claim 23 wherein the map switch is configured to consecutively place a sub-portion of the predetermined portion for each consecutive frame until an entire portion of the predetermined portion is placed in the overhead.

26. The transport system of claim 23 wherein the map switch is configured to remove zeros in the predetermined portion until the amount of space allocated is filled.

* * * * *